United States Patent
Bogatzki et al.

(10) Patent No.: US 9,835,106 B2
(45) Date of Patent: Dec. 5, 2017

(54) METHOD OF MACHINE CONDITION MONITORING

(75) Inventors: Dorothea Bogatzki, Duesseldorf (DE); Peter Küper, Gladbeck (DE); Oleksandr Sobolyev, Duesseldorf (DE)

(73) Assignee: MAN Diesel & Turbo SE, Augsburg (DE)

( * ) Notice: Subject to any disclaimer, the term of this patent is extended or adjusted under 35 U.S.C. 154(b) by 806 days.

(21) Appl. No.: 13/545,289

(22) Filed: Jul. 10, 2012

(65) Prior Publication Data

US 2013/0018603 A1    Jan. 17, 2013

(30) Foreign Application Priority Data

Jul. 12, 2011    (DE) .......................... 10 2011 079 015

(51) Int. Cl.

| | | |
|---|---|---|
| G06F 15/00 | (2006.01) | |
| G01F 13/00 | (2006.01) | |
| F02D 41/22 | (2006.01) | |
| H02P 29/032 | (2016.01) | |

(52) U.S. Cl.
CPC .......... *F02D 41/22* (2013.01); *H02P 29/032* (2016.02); *Y02T 10/40* (2013.01)

(58) Field of Classification Search
CPC .......... F02D 41/22; Y02T 10/40; G06F 15/00; G06F 17/18; G01F 13/00
USPC .......................................... 702/45, 179, 182
See application file for complete search history.

(56) References Cited

U.S. PATENT DOCUMENTS

| | | | | |
|---|---|---|---|---|
| 4,758,964 | A | * | 7/1988 | Bittner et al. .................. 702/34 |
| 5,566,092 | A | * | 10/1996 | Wang et al. .................. 702/185 |
| 6,244,042 | B1 | | 6/2001 | Dickers et al. |
| 2008/0201104 | A1 | * | 8/2008 | Poncet et al. ................. 702/181 |
| 2009/0132180 | A1 | * | 5/2009 | Pearce .................... F02D 41/20 702/38 |
| 2009/0284204 | A1 | * | 11/2009 | Colby et al. .................. 318/490 |
| 2010/0079301 | A1 | * | 4/2010 | Rossaert ....................... 340/679 |
| 2010/0204819 | A1 | * | 8/2010 | Monin et al. ................. 700/197 |

FOREIGN PATENT DOCUMENTS

| | | |
|---|---|---|
| DE | 10 2004 050 899 | 4/2006 |
| DE | 10 2004 058 682 | 6/2006 |

\* cited by examiner

*Primary Examiner* — Gregory J Toatley
*Assistant Examiner* — Christine Liao
(74) *Attorney, Agent, or Firm* — Cozen O'Connor

(57) ABSTRACT

A method of machine condition monitoring, wherein at least one measured and/or calculated machine parameter is monitored during the operation of a machine, and wherein a change in the machine condition, particularly a critical operating state of the machine, is deduced when at least one monitored machine parameter reaches a limit value, and wherein at least one monitored machine parameter is monitored depending on at least one other machine parameter in defined operating point ranges of the machine, wherein a change in machine condition is deduced when at least one monitored machine parameter within a defined operating point range reaches at least one limit value individual to the operating point range.

14 Claims, 1 Drawing Sheet

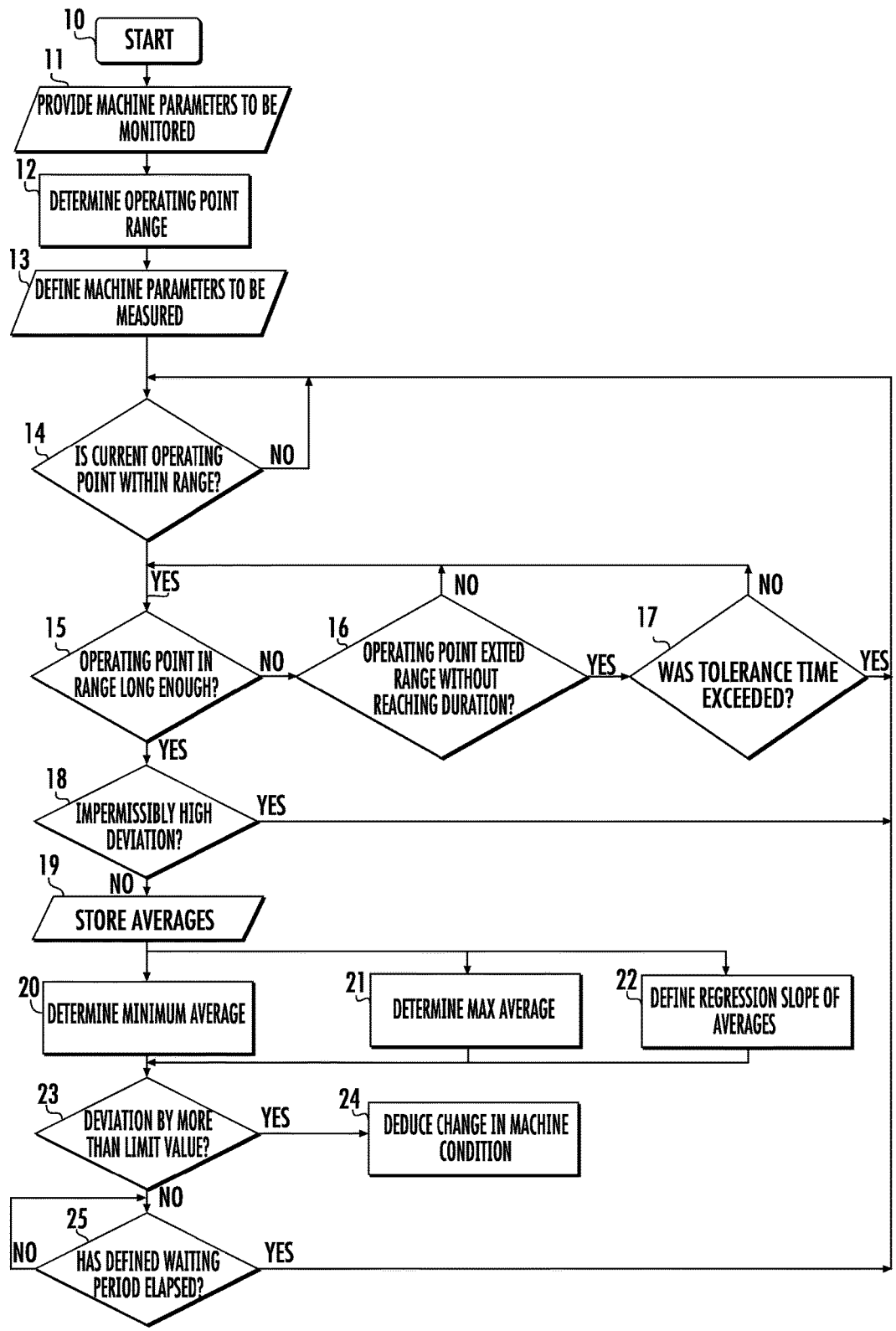

METHOD OF MACHINE CONDITION MONITORING

BACKGROUND OF THE INVENTION

1. Field of the Invention

The present invention is directed to a method of monitoring the operating condition of a machine.

2. Background of the Invention

Monitoring the state of machinery, also termed condition monitoring, relates to the detection of changes in the condition of a machine to be monitored in order that critical operating states of the machine in particular are detected promptly and, for example, to prevent damage to the machine. Methods of machine condition monitoring are already known from practice. In methods known from practice, at least one machine parameter is monitored during operation of the machine to be monitored, namely in such a way that a change in the machine condition, particularly a critical operating state of the machine, is deduced when at least one monitored machine parameter reaches a limit value. In so doing, it is possible, for example, to compare machine parameters such as, e.g., an electric current, an electric voltage, a temperature, a pressure, or also vibrations in the machine to be monitored with a global limit value which is applicable to the entire operating range of the machine. For example, it is known to determine a cumulative vibration value based on a vibration analysis carried out over the entire operating range of the machine and to compare this cumulative vibration value with a global limit value which is valid for the entire operating range, and a change in the machine condition is deduced when the cumulative vibration value reaches the global limit value. But while machine condition monitoring can be implemented by such known methods, their diagnostic power is limited.

On this basis, it is an object of the present invention to provide a novel method of machine condition monitoring. According to the present invention, at least one monitored machine parameter is monitored depending on at least one other machine parameter within defined operating point ranges, and a change in condition is deduced when at least one monitored machine parameter within a defined operating point range reaches at least one limit value individual to the operating point range.

SUMMARY OF THE INVENTION

The present invention proposes a completely novel method of machine condition monitoring. Accordingly, within the meaning of the present invention, at least one monitored machine parameter is monitored depending on at least one other machine parameter in defined operating point ranges, and a change in the condition of the machine is deduced when at least one monitored machine parameter reaches at least one individual limit value within a defined operating point range. Accordingly, it lies within the scope of the present invention to monitor machine parameters depending on other machine parameters for defined operating point ranges rather than monitoring machine parameters in isolation by themselves globally over the entire operating range. In this way, a long-lasting, progressing change in machine condition can be reliably detected.

An operating range of the machine is preferably divided as an at least one-dimensional matrix into operating point ranges, and the monitoring of the machine parameter to be monitored or of each machine parameter to be monitored in the operating point ranges is carried out in such a way that the operating point range in which a current operating point lies is determined initially and that the monitoring of the machine parameter to be monitored or of each machine parameter to be monitored is then carried out with reference to the, or each, corresponding limit value individual to the operating point range, particularly in operating point ranges of the operating range in which there occurs a relatively large quantity of the operating points actually traversed by the machine.

The above procedure allows a particularly efficient machine condition monitoring. When an operating range of the machine is divided into operating point ranges and monitoring is carried out exclusively in those operating point ranges in which there occurs a relatively large quantity of operating points actually traversed by the machine, an efficient machine condition monitoring can be provided while making optimal use of available resources.

When a monitored machine parameter is monitored depending on one other machine parameter, the operating range is divided up as a one-dimensional matrix or as a vector. When a monitored machine parameter is monitored depending on two other machine parameters, the operating range is divided as two-dimensional matrix. When a monitored machine parameter is monitored depending on a quantity i of other machine parameters, the operating range is divided as an i-dimensional matrix.

By operating point range is meant a range from the entire global operating range of the machine which has a defined breadth with respect to the machine parameters relevant for the operating point. The machine parameters relevant for the operating point range determine the dimension of the operating point range.

According to an advantageous further embodiment of the invention, an operating point for monitoring the machine parameter to be monitored or each machine parameter to be monitored is used only when the same operating point was traversed for a defined minimum duration in the respective operating point range. It is preferably permissible to exit the respective operating point range for less than a defined tolerance time.

When the operating point for monitoring is used only when the same operating point was traversed for a defined minimum duration in the respective operating point range, the reliability of the machine condition monitoring can be increased because operating points which have been traversed only briefly and which have little diagnostic force are then not inputted in the machine condition monitoring.

Exiting from an operating point range merely briefly for a tolerance time is not taken into account in the machine condition monitoring so that the practicability of the machine condition monitoring can be increased without impairing the quality thereof.

For a current operating point, the monitoring of the machine parameter to be monitored or of each machine parameter to be monitored in the respective operating point range is preferably carried out in such a way that an average is initially determined in each instance for the current operating point for the machine parameter to be monitored or each machine parameter to be monitored, and the monitoring of the average determined for the current operating point or of each average determined for the current operating point is then carried out with reference to the limit value, or each limit value, individual to the operating point range, namely in such a way that it is checked whether or not at least one of the averages determined for the current operating point deviates from the respective averages determined for the same operating point range from preceding operating points by more than a corresponding limit value individual to the operating point range. The above-mentioned evaluation allows a particularly simple and efficient machine condition monitoring by means of a statistical evaluation of the machine parameter to be monitored or of each machine parameter to be monitored.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

The present invention is described more fully with reference to the drawing in which:

FIG. 1 is a signal flow chart illustrating the method according to the present invention of machine condition monitoring.

DETAILED DESCRIPTION OF THE PRESENTLY PREFERRED EMBODIMENTS

The present invention is directed to a method of machine condition monitoring in order to detect changes of a machine condition, for example, in order to detect critical operating states of the machine.

In the following, the invention is described for the case of application in which fouling of a turbomachine, for example, a compressor, is to be monitored as the critical operating state. By fouling is meant deposits on the turbomachine or soiling thereof occurring during operation. The method is described in detail with reference to the signal flow chart in FIG. 1.

A block 10 of the signal flow chart in FIG. 1 represents the start of the method according to the invention of machine condition monitoring, namely, of monitoring fouling of a turbomachine.

Machine parameters to be monitored are given in a block 11 of the method according to the invention. In detecting fouling of a turbomachine, the machine parameters to be monitored are preferably a volume flow and an enthalpy difference defining an operating range of the turbomachine in the form of a characteristic field.

Further, magnitudes or values are given in block 11 for dividing the operating range of the machine to be monitored, in this case, the characteristic field of the turbomachine depending on volume flow and enthalpy difference, as a preferably multidimensional matrix into a plurality of operating point ranges.

Accordingly, a parameter range breadth or field dimension for the operating point ranges of the characteristic field is defined in block 11 for the enthalpy difference and volume flow; the field dimensions for the operating point ranges can be freely selected at the discretion of the user.

Depending on the selected field dimensions or parameter range breadths for the operating point ranges of the machine, the entire operating range of the machine, in this case, the characteristic field of the turbomachine, is divided into a quantity N of operating point ranges, where a quantity k (k<N) of operating point ranges is additionally given in block 11 from the total quantity N of operating point ranges, which are to be taken into account for a practicable implementation of the method according to the invention and so as to economize on resources.

In a block 12 of the method according to the invention, those operating point ranges in which there occurs a relatively large quantity of operating points actually traversed by the machine are determined during the operation of the machine to be monitored after the entire operating range of the machine has been divided into the quantity N of operating point ranges. Accordingly, the k most traversed operating point ranges are determined in block 12 from the total quantity N of operating point ranges of the operating range of the machine.

The machine parameters which are measured and/or calculated by means of the method to be carried out subsequently are defined in a block 13; in the preferred case of application, namely, detection of fouling of a turbomachine, these machine parameters which are measured and/or calculated and specified in block 13 can preferably be a guide vane position of the turbomachine, a degree of efficiency thereof, and other machine parameters such as temperatures and pressures thereof.

After the entire or global operating range of the machine has been divided into a total quantity N of operating point ranges as a multidimensional matrix and the k most traversed operating point ranges have been determined from this total quantity N of operating point ranges in blocks 11, 12 and 13, the actual machine condition monitoring is then carried out subsequently in blocks 14 to 25, namely, in each instance, for the k most traversed operating point ranges from the total quantity N of operating points using the data defined in block 13.

In a step 14, it is checked whether or not a current operating point of the machine, in this case, the turbomachine, occurs in one of the k most traversed operating point ranges.

If it is determined in step 14 that a current traversed operating point does not occur in one of the k most traversed operating point ranges, this currently traversed operating point is not used for the subsequent machine condition monitoring, but rather a return to block 14 is performed according to the return path in FIG. 1.

Conversely, if it is determined in block 14 that a currently traversed operating point occurs in one of the k most traversed operating point ranges, a branch is made from block 14 to block 15 and the machine condition monitoring continues.

It is checked in block 15 whether or not the current operating point was traversed in the respective operating point range for a minimum duration. If this is not the case, i.e., if the current operating point did not occur in the respective operating point range for the minimum duration required for the evaluation, a branch is made from block 15 to block 16 and it is checked in block 16 whether the operating point is still in the respective operating point range or has exited it.

If it is determined in block 16 that the operating point still lies in the corresponding operating point range, a return from block 16 to block 15 is made and it is checked again whether or not the minimum duration was reached in the respective operating point range. Conversely, if it is determined in block 16 that the current operating point has exited the respective operating point range without yet reaching the minimum duration in the respective operating point range, a branch is made from block 16 to block 17 and it is checked in block 17 whether or not the exit from the respective operating point range took place in less than a defined tolerance time.

If this is not the case, i.e., the tolerance time for exiting the respective operating point range during monitoring and evaluation of a currently traversed operating point was exceeded, a return is made from block 17 to block 14 and the condition monitoring is not carried out further for this current operating point.

Conversely, if it is determined in block 17 that the tolerance time for exiting the respective operating point range was not exceeded, i.e., the current operating point exited the operating point range only briefly, a branch is made from block 17 to block 15 and the machine condition monitoring continues, namely, in such a way that a branch is made from block 15 to block 18 when it is determined in block 15 that the current operating point was traversed in the respective operating point range for the defined minimum duration.

An optional filtering of the machine condition monitoring or of the monitoring of the machine parameter to be monitored or each machine parameter to be monitored in the respective operating point range of the currently monitored operating point according to at least one other machine parameter can be carried out in block 18.

If it is determined in block 18 that there is an impermissibly high deviation from a comparison value for the other machine parameter or for each of the other machine parameters, a return is made from block 18 to block 14 and the monitoring of the respective machine parameter to be monitored for the current operating point is aborted.

When monitoring the fouling condition of a turbomachine, this other machine parameter which serves for filtering in block 18 can be an intake temperature of the turbomachine, for example. If it is determined that the intake temperature in the current operating point range of the operating point which is currently to be evaluated deviates from a corresponding comparison value by more than a limit value, further condition monitoring is terminated so as to prevent an intake temperature deviation from influencing the detection of fouling at the turbomachine and to eliminate bogus detection of fouling caused by an impermissibly high intake temperature deviation.

When no filtering of the current operating point is carried out in block 18, a branch is made from block 18 to block 19, and a corresponding average is then determined and stored in block 19 in each instance for the current operating point, namely, for the monitored machine parameters of the current operating point.

When monitoring the fouling of the turbomachine, in particular for a current operating point, an average of the guide vane position and an average of the efficiency for the current operating point are determined and stored in block 19.

A branch is then made to blocks 20, 21 and 22 proceeding from block 19 and the corresponding determination of an average for the current operating point of the machine parameters to be monitored in the current operating point.

Accordingly, in a preferred embodiment of the monitoring of fouling of a turbomachine, an absolute minimum of all of the averages of the guide vane position determined and stored for the operating point range corresponding to the current operating point is defined in block 20.

The absolute maximum of all of the averages of degrees of efficiency determined and stored for the operating point range corresponding to the current operating point is defined in block 21 for the operating point range corresponding to the current operating point.

In block 22, at least one regression slope, in this case a regression slope of the averages of the guide vane position, is defined from the determined and stored averages of the operating point range corresponding to the current operating point.

Subsequently, a branch is made from blocks 20 and 21 and 22 to block 23. It is checked in block 23 whether or not at least one of the averages determined for the current operating point deviates from the respective averages determined for the same operating point range from preceding operating points by more than a corresponding limit value individual to the operating point range.

Accordingly, for a preferred embodiment of the monitoring of fouling of a turbomachine, it is checked whether or not the average of the guide vane position determined for the current operating point deviates from the absolute minimum of the guide vane position of the corresponding operating point range by more than a limit value.

With respect to the average of the degree of efficiency, it is checked in block 23 whether or not the average of the degree of efficiency determined for the current operating point deviates from the respective absolute maximum of the corresponding operating point range by more than a limit value.

For the regression slope, it is checked in block 23 whether or not this regression slope is greater than an individual limit value of the corresponding operating point range.

If a deviation of this kind is determined in block 23 for at least one average and/or for the regression slope, a branch is made from block 23 to block 24 and a change in the machine condition, for example, a critical operating state of the machine, is deduced in block 24; in the preferred embodiment, a fouling of the turbomachine is deduced.

If, on the other hand, it is determined in block 23 that no corresponding deviation from a corresponding limit value individual to the operating point exists either for one of the determined averages or for the regression slope, a branch is performed from block 23 to block 25, and it is checked in block 25 whether or not a defined waiting period for the operating point range corresponding to the current operating point has elapsed.

If this is not the case, a return is made from block 23 to block 25, and further execution of the machine condition monitoring is delayed until this waiting period elapses. Conversely, if it is determined in block 25 that the waiting period has elapsed, a return is made from block 25 back to block 14 and the machine condition monitoring continues.

The present invention allows a prompt and timely detection of changes in machine conditions and, therefore, of critical operating states of the machine to be monitored. Failure of and damage to machinery can be prevented in this way.

The method according to the present invention allows machine parameters to be monitored depending on other machine parameters by dividing the operating range within the meaning of an at least one-dimensional, preferably multidimensional, matrix into operating point ranges representing quasi-static or static operating point ranges of the entire operating range of the machine. A quasi-static or static operation of the machine to be monitored takes place in quasi-static or static operating point ranges of this kind. In this respect, it is assumed that a parameter to be monitored—in the case of the embodiment shown in the drawing, a guide vane position to be monitored or an efficiency to be monitored—remains essentially unchanged within a quasi-static or static operating point range of this kind and a corresponding change in the parameter to be monitored only takes place when there is a change in the machine condition.

In order to economize on resources, only the most traversed quasi-static or static operating point ranges are used for the method according to the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method of monitoring a fouling condition of a machine comprising:
   measuring at least one machine parameter;
   monitoring the at least one measured machine parameter during operation of a machine;
   deducing a change in the fouling condition of the machine when at least one monitored measured machine parameter reaches a limit value,
   wherein the at least one monitored machine parameter is monitored depending on at least one machine parameter other than the at least one monitored machine parameter in defined operating point ranges of the machine,
   wherein a change in fouling condition of the machine is deduced when at least one monitored machine parameter within a defined operating point range reaches at least one limit value individual to the operating point range,
   wherein a currently traversed operating point is used for monitoring the fouling condition of the machine only when the currently traversed operating point has been traversed in the respective operating point range for a defined minimum duration, except that an exiting from the respective operating point range for less than a defined tolerance time is permitted;
   determining the machine is in a fouled condition based at least in part on the measured at least one machine parameter; and
   conducting failure and damage control operations to the machine based on the determination that the machine is in the fouled condition.

2. The method according to claim 1, wherein an operating range of the machine is divided as an at least one-dimensional matrix into operating point ranges, and the monitoring of the machine parameter to be monitored or of each machine parameter to be monitored in the operating point ranges is carried out in such a way that the operating point range in which a current operating point lies is determined initially and that the monitoring of the machine parameter to be monitored or of each machine parameter to be monitored is then carried out with reference to the, or each, corresponding limit value individual to the operating point range.

3. The method according to claim 2, wherein the monitoring of the machine parameter to be monitored or of each machine parameter to be monitored is carried out exclusively in a defined quantity of operating point ranges of the operating range of the machine.

4. The method according to claim 2, wherein the monitoring of the machine parameter to be monitored or of each machine parameter to be monitored is carried out exclusively in those operating point ranges of the operating range in which there occurs a relatively large quantity of operating points actually traversed by the machine.

5. The method according to claim 2, wherein the monitoring of the machine parameter to be monitored or of each machine parameter to be monitored is carried out exclusively in quasi-static operating point ranges or static operating point ranges of the operating range of the machine.

6. The method according to claim 1, wherein the monitoring of the machine parameter to be monitored or of each machine parameter to be monitored is carried out exclusively in a defined quantity of operating point ranges of the operating range of the machine.

7. The method according to claim 1, wherein the monitoring of the machine parameter to be monitored or of each machine parameter to be monitored is carried out exclusively in those operating point ranges of the operating range in which there occurs a relatively large quantity of operating points actually traversed by the machine.

8. The method according to claim 1, wherein the monitoring of the machine parameter to be monitored or of each machine parameter to be monitored is carried out exclusively in quasi-static operating point ranges or static operating point ranges of the operating range of the machine.

9. The method according to claim 1, wherein the monitoring of the machine parameter to be monitored or of each machine parameter to be monitored in the respective operating point range is carried out for a current operating point in such a way that an average for the current operating point for the machine parameter to be monitored or for each machine parameter to be monitored is initially determined and stored, and the monitoring of the average, or of each average, determined for the current operating point is subsequently carried out with respect to the limit value, or each limit value, individual to the operating point range.

10. The method according to claim 9, wherein the subsequent monitoring of the average determined for the current operating point with respect to the limit value is performed by checking whether or not at least one of the averages determined for the current operating point deviates from the respective averages determined for the same operating point range from preceding operating points by more than a corresponding limit value individual to the operating point range.

11. The method according to claim 9, wherein after determining and storing an average for an operating point range in the same operating point range a new monitoring of the machine parameter to be monitored or of each machine parameter to be monitored in the corresponding operating point range is carried out only after the expiration of a defined waiting period.

12. The method according to claim 1, wherein during the monitoring of the machine parameter to be monitored or of each machine parameter to be monitored in the defined operating point ranges, a filtering is carried out according to the at least one other machine parameter in such a way that if it is determined that the other machine parameter or each other machine parameter deviates to an impermissible extent from a comparison value, the corresponding operating point is not used for the monitoring of the machine parameter to be monitored or of each machine parameter to be monitored.

13. The method according to claim 1, wherein the deduced change in the fouling condition of the machine is a critical operation state of the machine.

14. The method according to claim 13, wherein the deducing of the critical operation state includes determining fouling of a turbomachine, and wherein, as an operating range of the turbomachine, a characteristic field of the turbomachine depending on volume flow and enthalpy difference is divided into operating point ranges, in that a defined quantity of operating point ranges of the characteristic field which are those most traversed is initially determined, and in that, as a machine parameter, one of a guide vane position and an efficiency of the turbomachine is subsequently monitored in these most traversed operating point ranges, and wherein a fouling of the turbomachine is deduced when one of the monitored guide vane position and the monitored efficiency within a defined operating point range reaches a limit value individual to the operating point range.

* * * * *